(12) United States Patent
Seif et al.

(10) Patent No.: US 8,688,116 B2
(45) Date of Patent: Apr. 1, 2014

(54) MOBILE TELECOMMUNICATION SELECTING METHOD

(75) Inventors: Jacques Seif, Meudon (FR); Christophe Dubois, Meudon (FR)

(73) Assignee: Gemalto SA, Meudon (FR)

( * ) Notice: Subject to any disclaimer, the term of this patent is extended or adjusted under 35 U.S.C. 154(b) by 393 days.

(21) Appl. No.: 12/738,825

(22) PCT Filed: Oct. 16, 2008

(86) PCT No.: PCT/EP2008/063980
§ 371 (c)(1),
(2), (4) Date: Jun. 3, 2010

(87) PCT Pub. No.: WO2009/050241
PCT Pub. Date: Apr. 23, 2009

(65) Prior Publication Data
US 2010/0279688 A1 Nov. 4, 2010

(30) Foreign Application Priority Data
Oct. 18, 2007 (EP) .................................. 07020395

(51) Int. Cl.
*H04J 3/17* (2006.01)
(52) U.S. Cl.
USPC ................. 455/435.2; 455/435.1; 455/557; 455/558
(58) Field of Classification Search
USPC ............. 455/432.1, 432.3, 434, 435.1, 435.2, 455/436, 438, 439, 557, 558, 556.1
See application file for complete search history.

(56) References Cited

U.S. PATENT DOCUMENTS

| | | | |
|---|---|---|---|
| 2004/0087305 A1 | 5/2004 | Jiang et al. | |
| 2004/0151162 A1 | 8/2004 | Ramaswamy | |
| 2006/0160537 A1* | 7/2006 | Buckley et al. | 455/435.2 |
| 2006/0172737 A1* | 8/2006 | Hind et al. | 455/435.2 |
| 2006/0194582 A1* | 8/2006 | Cooper | 455/436 |
| 2006/0209891 A1 | 9/2006 | Yamada et al. | |
| 2007/0111740 A1* | 5/2007 | Wandel | 455/513 |
| 2007/0129078 A1* | 6/2007 | De Beer | 455/445 |
| 2011/0281589 A1* | 11/2011 | De Beer | 455/445 |

FOREIGN PATENT DOCUMENTS

| | | |
|---|---|---|
| EP | 1463366 A2 | 9/2004 |
| EP | 1526682 A2 | 4/2005 |
| EP | 1613113 A1 | 1/2006 |
| EP | 1648123 A1 | 4/2006 |
| WO | WO 99/45723 A | 9/1999 |
| WO | WO 02/21861 A2 | 3/2002 |

OTHER PUBLICATIONS

PCT/EP2008/063980 International Search Report Nov. 27, 2008, whole document. European Patent Office, P.B. 5818 Patentlaan 2 NL-2280 HV Rijswijk.
PCT/EP2008/063980 Written Opinion of the International Searching Authority, whole document. European Patent Office—Gitschiner Str. 103 D-10958 Berlin.

* cited by examiner

*Primary Examiner* — Jean Gelin
(74) *Attorney, Agent, or Firm* — The Jansson Firm; Pehr B. Jansson

(57) ABSTRACT

The invention relates to a method to select a telecommunication network with a mobile equipment (10,20) comprising a mobile communication device (10) and a personal token (20), the method operating an algorithm (25) which selects at least one network to be operated by the mobile equipment among a plurality of available networks, wherein in the method, the algorithm is stored and run in the personal token (20).

14 Claims, 2 Drawing Sheets

MOBILE TELECOMMUNICATION SELECTING METHOD

BACKGROUND OF THE INVENTION

The invention relates to personal tokens when associated with a mobile telecommunication device, such as smart card associated with mobile phones, typically called SIM cards, or more specifically UICC, SIM, USIM, ISIM, R-UIM, CSIM . . . .

The assembly of a mobile telecommunication device with its personal token will be called hereafter a mobile equipment.

Nowadays, several telecommunication networks may be available for a same mobile equipment. For example, a PDA or a mobile phone may be enabled for the 2G and 3G (GSM/UMTS) network of an operator, for a WiMax network of the same or different operator, for internet communication possibly through an I-WLAN network, also called WiFi access, for CDMA2000 networks, etc. . . .

An automatic choice has to be made by the mobile equipment itself, taking into account the networks available so as to determine the preferred one of the available networks.

Some procedure has been proposed and widely implemented for the purpose of such choice by the mobile equipment, which makes use of a list of decreasingly preferred networks. This list is known as the PLMN list for Preferred List of Mobile Networks and is stored in the smart card.

The list is read by the mobile equipment, from the most desired network to the less desired network, and the first network which appears to be available is the one which gets chosen as the one to be used.

The PLMN list is also used when the mobile equipment is introduced into a foreign territory as it comprises the most preferred networks of said foreign country as well, classified also from the most desired network to the less desired network.

This solution lacks flexibility. The operators cannot cope with all possible scenarios in order to provide the best service for their customers and can therefore not fulfill all the possible business needs.

The operators do not have the ability to fully control the network selection procedures in order to transparently guide a communicating device to select the preferred access/partner network. The operators need a solution to be able to fully control these network selection procedures in order to ensure the best service for their subscribers in a user-friendly manner, i.e. without any user intervention if possible.

SUMMARY OF THE INVENTION

It is an aim of the invention to propose a solution to such problems. This purpose is achieved by means of the invention as recited in the appended claims.

By means of the invention, they get able to choose one particular access technology and one particular service provider, notably in a roaming situation, to get and keep access to a service, either the service be voice calls or internet connection or other kind of services.

Mobile equipments supporting different radio interfaces, e.g. GSM, UMTS, CDMA2000, WLAN, WiMAX will be automatically configured by the operator thanks to the invention.

BRIEF DESCRIPTION OF THE DRAWINGS

Other aspects, purposes and benefits of the invention will appear through the following description, which is made in reference to the attached figures, among which.

DETAILED DESCRIPTION

There will be explained hereafter how an algorithm of the invention takes account of parameters provided by a mobile handset and determines which one of the available networks has to be taken as the serving network and instructs the mobile handset to attach to the selected network(s).

Let's assume a mobile equipment comprising a mobile handset 10 and a SIM card 20, which SIM card corresponds to a mobile telephony account 25 in a server of a national mobile phone operator, for example a Chinese mobile operator CN1.

The end-user carrying the mobile equipment 10, 20 enters into a foreign country, for example New Zealand.

The SIM card 20 stores a profile of the end-user, i.e. at least a service he is entitled to, i.e at least one service that the Chinese operator has committed to deliver to this end-user. The services an end-user is entitled to typically depends on the fees the end-user pays to the operator every month.

In the first example, the end-user is entitled to voice calls and to a certain number of application downloads every month. These applications require a given bandwidth for being successfully downloaded and operated, i.e. a necessary bandwidth of 200 kbits/seconds in the present example.

When entering into New Zealand territory, the mobile equipment 10, 20 has to choose which one of the available networks will be activated for voice calls as well as for support of the downloads of applications.

In a first step A, the SIM card requests the mobile handset to indicate which networks are available, i.e. which networks the mobile handset may be able to have access to, depending on the present location and signal levels. Another possibility is that the mobile handset automatically provides the discovered information after the initial search of available networks. In the present case the mobile handset is enabled for detecting 2G and 3G mobile networks, WiFi accesses to Internet network, and accesses to WiMax network.

The mobile handset responds to the SIM card with a list of accessible networks comprising associated attributes of the accessible networks.

Figure 1:
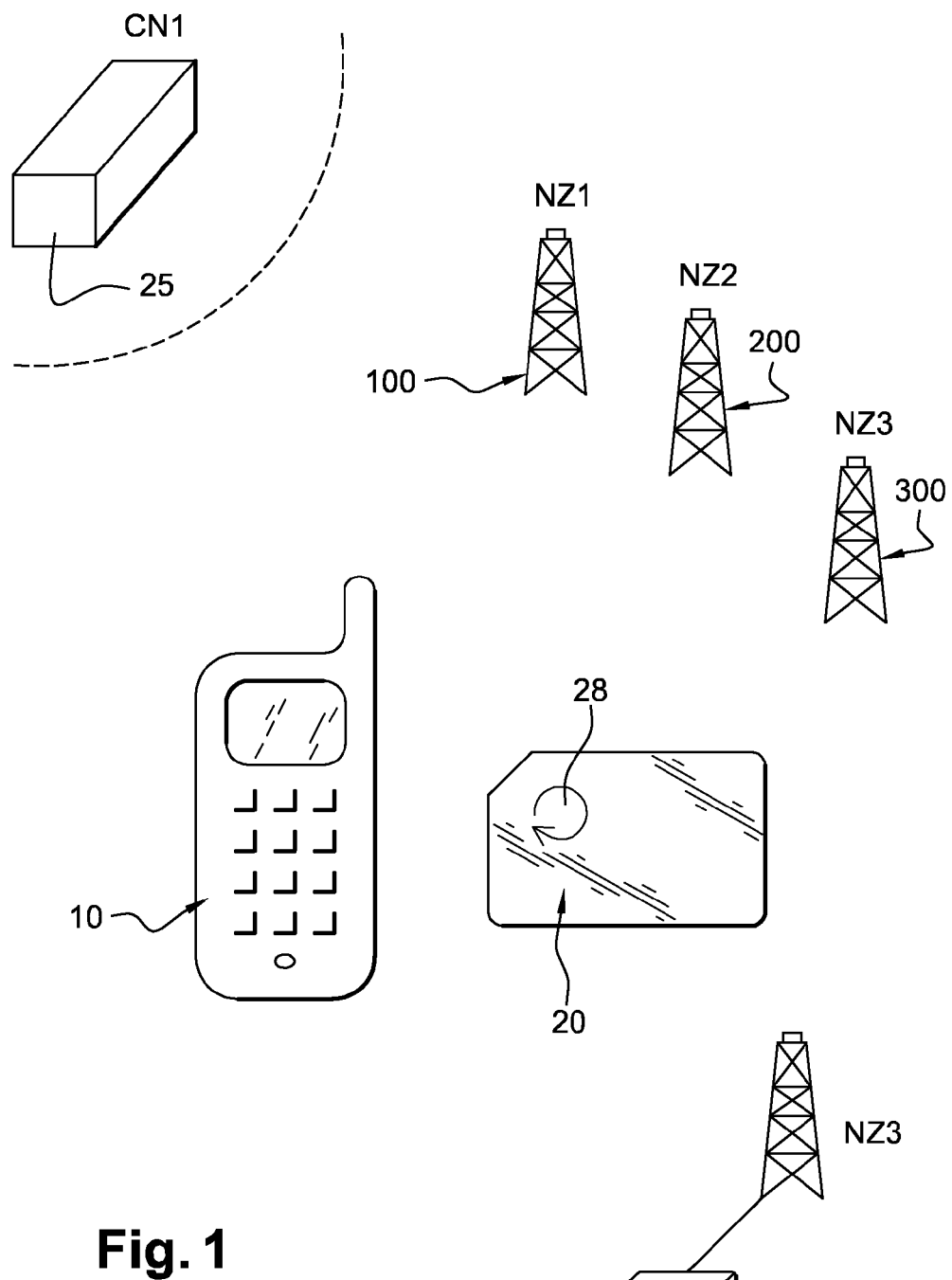
FIG. 1 depicts a mobile equipment according to a preferred embodiment of the invention.
Figure 2:
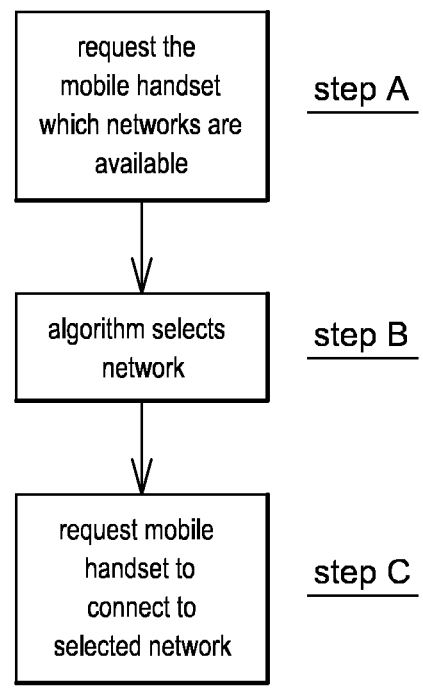
FIG. 2 is a diagram which depicts a method according to a preferred embodiment of the invention.

In the present case, the mobile handset responds to the SIM card with the following list of networks: 1) 2G network operated by operator NZ1, with a standard quality of service allowing a classical bandwidth for a 2G network, referenced 100 on FIG. 1, 2) 3G network operated by operator NZ2, quality of service allowing a bandwidth of 256 kbits/second, referenced 200 on FIG. 1, 3) 3G network operated by operator NZ3, allowing a quality of service of 512 kbits/seconds, referenced 300 on FIG. 1, 4) WiFi access to internet (also called I-WLAN network) operated operator NZ3, with a quality of service allowing a bandwidth of 1 Mbits/second, referenced 400 on FIG. 1.

In a second step B, the card runs an algorithm 28 which takes these different information into account as well as other information, already stored in the card. These other information comprise the profile of the end-user, i.e. the services he is entitled to, as well as the commercial preferences of the Chinese operator CN1 as to possible New Zealand operators. Those preferences of operator CN1 depend typically on commercial agreements he has with the New Zealand operators. In particular the operators which propose the best commercial roaming conditions to CN1 will be the most preferred roaming operators.

The processing performed by the in-card algorithm 28 first consists in selecting those of the available networks which allow to transport the services the end-user is entitled to. In the present case, taking account that the end-user needs to download and run applications, the necessary bandwidth is 200 Kbits/second and this necessary bandwidth is stored as an information inside the card.

The algorithm hence first determines that networks 200, 300, and 400 are the possible networks, i.e. 3G network 200 operated by operator NZ2, with a quality of service allowing a bandwidth of 256 kbits/second, 3G network 300 operated by operator NZ3, allowing a quality of service of 512 kbits/seconds, and WiFi access to internet network (also called I-WLAN network for the internet network comprising its WiFi access) as operated by operator NZ3, with a quality of service allowing a bandwidth of 1 Mbits/second.

The in-card algorithm then applies a selection onto the networks 200, 300 and 400 which consists in selecting a preferred telecommunication technology. In the present example, the algorithm opts preferably for a cellular mobile phone technology, preferred to an I-WLAN network technology or a WiMax network technology. If only the I-WLAN network is available, the mobile equipment opts for such network.

The result of this second selection step is a list of two networks, i.e. networks 200 and 300, i.e. 3G network 200 operated by operator NZ2, with a quality of service allowing a bandwidth of 256 kbits/second and 3G network 300 operated by operator NZ3, allowing a quality of service of 512 kbits/second.

A last selection step consists in taking account of the commercial preferences of the operator CN1 among the list of remaining networks, i.e. networks 200 and 300.

For this last selection step, the card stores a list of preferred operators for New Zealand, with a decreasing order of preferences. The in-card algorithm compares the list of remaining New Zealand networks and the list of the preferred New Zealand operators. The result of the comparison is the commercially most preferred network among the remaining networks. In this list, operator NZ3 is placed before operator NZ2. The resulting network is hence network NZ3.

In a third and last step C, the SIM card requests the mobile handset to connect to network NZ3 in order to get access to the network and to the services. The SIM card could also provide the ME with a list of networks to be used (in priority order) in case some particular services are triggered or in case the access to network NZ3 is lost.

In a second example, the end-user is only entitled to a voice call service and the end-user profile, as stored in the card, reflects such situation. The algorithm first selects the networks allowing the voice call service, i.e. all the networks in the present case, and then the algorithm selects the commercially preferable one of the available networks. In this case, the most preferable network is network 100, i.e. 2G network operated by operator NZ1, with a standard quality of service allowing a classical bandwidth for a 2G network, referenced 100 on FIG. 1.

Indeed the 2G network is less costly than a 3G network and is sufficient for the basis end-user profile. The SIM card requests the mobile handset to attach to network NZ1.

The operator can update the list of his preferred operators, which is taken into account at the end by the selecting algorithm, taking account of the abilities of some foreign operators to deliver certain services the user is entitled to, for example short numbers dialing possibility with the numbers the end-user is accustomed to, which not all the foreign operators interpret the same as CN1. Another special service the end-user may be entitled to may be for example special information to the end-user, such as current restaurants or particular shops depending on the current location of the end-user. The fact that the list of preferred operators and other parameters for selection are stored in the card allows the operator to own those parameters, i.e. to choose easily those parameters, either before issuing the card or after the card is on field, via OTA download (over-the-air download).

Parameters provided by the mobile handset may be taken into account other than the above described quality of service. While still not connected to a network, the mobile handset may be able, simply reading this information available at the radio interface of the network, to identify whether a network is able to deliver a special service. Such information may be for example the fact that the available network delivers mobile TV or not. The fact that this service is available or not appears directly on the radio interface of the network, hence it is not necessary for the mobile equipment to connect to the network to discover that the network delivers this service or not.

A selection step performed by the selecting algorithm may be to compare the available services on a given network to a user profile as stored in the card so as to assess whether such network fulfills all the services needed by the end-user and thereby to make a selection of such networks. Other such networks may as well be selected as part of a selecting step.

Notably in case the available services of a network do not appear on the radio interface, the in-card algorithm may take account of the fact that a given network delivers a service or not by the original operator CN1 in the present case, delivering a list of preferred networks specifically in accordance with the user profile. For example, for a user profile implying short number dialing, the NZ networks that the CN operator CN1 knows as implementing such service will be placed first in the list of preferred networks. Other examples of such services that the original operator may know as implemented through his preferred networks may be for example Internet access, Location services, Video Calls, Conferencing services as another example.

Implementing a specific preferred list of operators as for the services that those operators are able to deliver differs from a pure band width concern, which last approach simply consists in ensuring that a wide enough pipe for data is established between the handset and the original operator, here CN1, through a selected local operator such as NZ3.

In the present embodiment, the card is enabled for a quick change of serving network operator under control of the home operator. The card hosts an application which may run when it receives a command from a remote server, preferably in an SMS encapsulating such command, or when a condition of an internal event is fulfilled. This application actuates a change of network as soon as the command is received and executed by the card. The change of network first consists in disconnecting the mobile equipment from the network it is presently associated, and then in connecting the mobile equipment to the network which is indicated by the received command. This network switching is transparent to the end-user as it is quick and as it may happen, as in the present example, while the mobile equipment is connected to a network. In an alternate embodiment, the in-card selection algorithm as described above is arranged for taking account of an incoming command requiring the algorithm to run again and to deliver a resulting network to be switched onto. The algorithm is enabled to run again when receiving the command while the phone is connected to the present network, and to select a network to be switched onto, taking account the same nature of parameters as when the phone was initially powered on as in the above example. This network switching is also transparent to the end-user as it is quick and as it may happen, as in the present example, while the mobile equipment is connected to a network.

Such an actuation of the selecting algorithm is performed by sending an SMS encapsulating the actuation command and executing such actuation command on the card as soon as the command is received.

Actuation of the selecting algorithm allows to take account of any network that may have become available since the last selection, i.e. to actuate a network that may advantageously replace the one that had been selected previously the advantage of the newly selected network over the previous one being either technical, commercial, or in terms of available services.

The whole selecting algorithm and its parameters might also be updated by a remote server in order to take into account changes in the parameters due to evolutions of networks capabilities or due to evolutions of home operator partnership agreements.

The invention claimed is:

1. A method to select a telecommunication network with a mobile equipment (10,20) comprising a mobile communication device (10) and a personal token (20) associated with a user and a home telephony operator, the method comprising
operating an algorithm (25) which selects at least one network to be operated by the mobile equipment among a plurality of available networks, wherein the algorithm is stored and run in the personal token (20) and wherein the algorithm (25) implements a selection which takes into account communications technology offered by each of the plurality of available networks, whether the available bandwidth (B) of a considered network sufficient to allow transport of services to which the user is entitled; and a preference ranking wherein the preference ranking ranks a set of preferred operators according to preferences for use by the home telephony operator.

2. The method according to claim 1, wherein the method further comprises providing the algorithm (25) with at least one parameter from the mobile communication device.

3. The method according to claim 1 or 2 wherein the method further comprises requesting the mobile communication device (10) to connect to a network(s) selected by the algorithm (25) among the available networks.

4. The method according to claim 1 or 2, wherein the algorithm (25) compares a necessary bandwidth with an available bandwidth in a considered network.

5. The method according to claim 1 or 2, wherein the algorithm (25) implements a selection which takes into account whether a service to which the user is entitled is available in the considered network.

6. The method according to claim 1 or 2, wherein the algorithm (25) implements a selection which takes into account an available service in a considered network through comparison of a user profile stored in the personal token (20) and which indicates that the end-user is entitled to a service with an information provided by the mobile communication device (10) as to availability of the said service in the considered network.

7. The method according to claim 1 or 2, further comprising receiving with the mobile equipment (10,20) a command from a remote server which instructs the mobile equipment to switch to a different network while the mobile equipment is connected to a present network, and the step which consists in switching to the said different network.

8. The method according to anyone of claim 1 or 2, further comprising receiving with the mobile equipment a command from a remote server which instructs the mobile equipment (10,20) to launch the said selection algorithm (25), the step which consists in launching the selection algorithm (25) when such instruction is received, and the step which consists in switching to the said different network while the mobile equipment (10,20) is still connected to the present network.

9. The method according to anyone of claim 1 or 2, further comprising receiving with the mobile equipment a command from a remote server which instructs the personal token (10, 20) to update the said selection algorithm (25) and or its associated input parameters.

10. The method according to claim 1 further comprising updating the preference rankings.

11. The method according to claim 10 wherein the preference rankings are updated taking into account whether particular networks are able to deliver services to which the user is entitled or accustomed.

12. A personal token for being associated with a mobile communication device thereby forming a mobile equipment (10,20), the personal token (20) being associated with a user and a home telephony operator, wherein the personal token (20) stores and runs a selecting algorithm (25) which selects at least one telecommunication network to be operated by the mobile equipment (10, 20) among a plurality of available networks using a selection algorithm which takes into account communications technology offered by each of the plurality of available networks, whether the available bandwidth (B) of a considered network sufficient to allow transport of services to which the user is entitled; and a preference ranking wherein the preference ranking ranks a set of preferred networks according to preferences for use by the home telephony operator.

13. The personal token of claim 12 wherein the selection algorithm takes into account whether a service to which the user is entitled is available in the considered network.

14. The personal token of claim 12 wherein the selection algorithm takes into account an available service in a considered network through comparison of a user profile stored in the personal token (20) and which indicates that the end-user is entitled to a service with an information provided by the mobile communication device (10) as to availability of the said service in the considered network.

* * * * *